2,992,071
METHOD OF PRODUCING HYDROGEN PEROXIDE

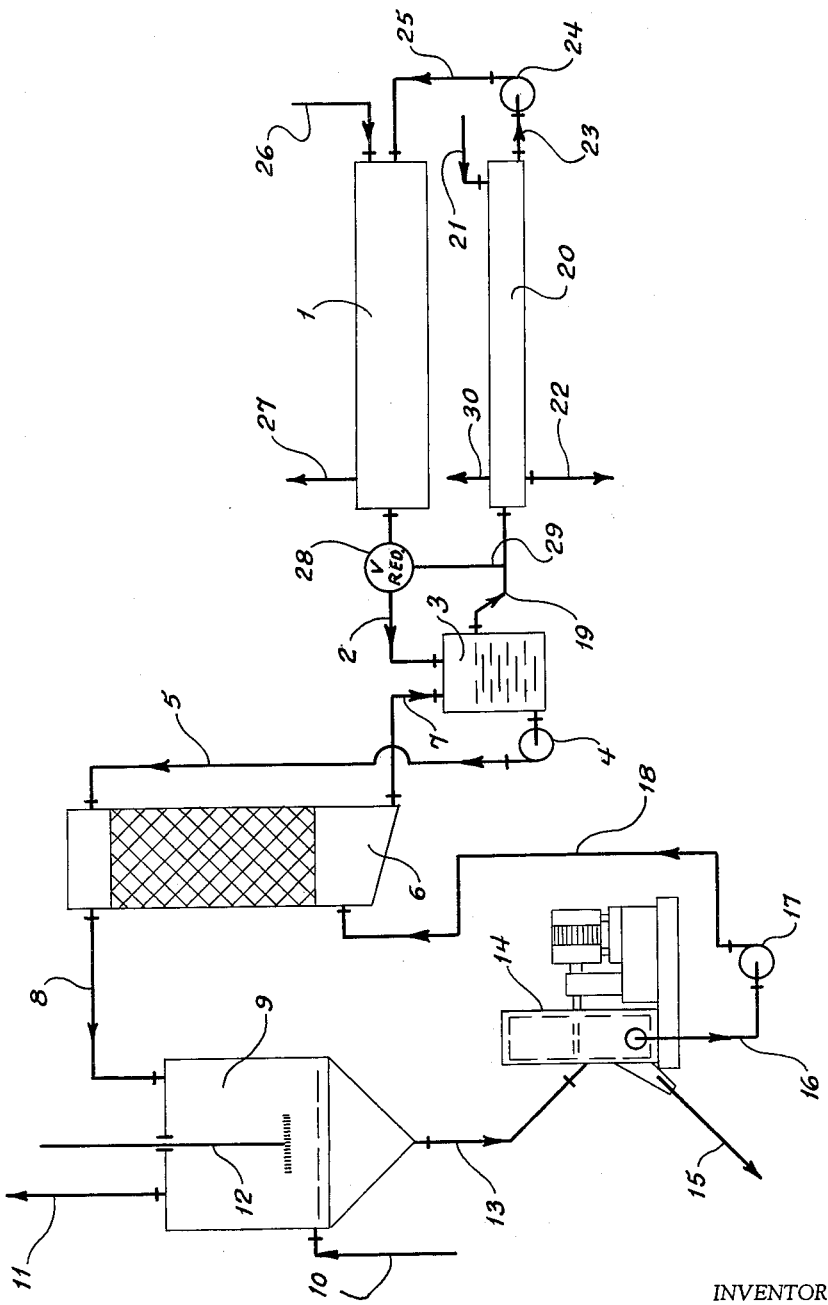

Runar Mauritz Rafaelsson Ornhjelm, Kuusankoski, Finland, assignor to Osakeyhtio-Kymmene Aktiebolag, Kuusankoski, Finland, a corporation of Finland
Filed Sept. 24, 1959, Ser. No. 842,037
Claims priority, application Finland Nov. 5, 1954
2 Claims. (Cl. 23—184)

This invention relates to a method of producing peroxides and in particular to such a method involving the oxidation of organic auto-oxidizable substance in solvents and then reducing said substance by contacting the same with alkali amalgam.

This application is a continuation-in-part of my application Serial No. 544,383, filed November 1, 1955, and entitled "Method of Producing Hydrogen Peroxide," now abandoned.

It is known that alkaline peroxides can be made by oxidation of certain organic compounds such as hydrazobenzene, dissolved in aqueous alkali bearing alcoholic solutions, the molecules of said compounds having two relatively easily removable hydrogen atoms which react to form the peroxide. That peroxide is recovered from other forms of oxidation of hydrocarbons for instance, azobenzene which last mentioned compound is reduced for reuse in the oxidation phase. Proposals have been made that azobenzene be hydrogenated by means of hydrogen in the presence of a catalyst but also in this case hydrogenation is carried out substantially with the aid of alkali amalgam, commonly sodium amalgam, which amalgam at the same time serves to provide the alkali amount requisite for the oxidation process and which is reused after electrolytical make up of the consumed alkali metal. Peroxides may be produced continuously if the hydrogenation phase and the oxidation are carried out in one and the same cycle and the electrolytical enrichment of the amalgam with an alkali metal and reduction are carried out in a second cycle. In addition to this the amount of active oxygen contained in the obtained peroxides may be adjusted by adding water to the oxidizing solution in amounts ranging from a negligible amount to 8 moles per each oxygen mole consumed.

Although the method as just stated has theoretically been fully explained the commercial application of the same has not met with success due to the inability to obtain the capacity required therefor. It is, accordingly, the principal object of this invention to enable that capacity to be obtained.

In all prior methods the amalgam for the reduction phase is withdrawn from an electrolytic cell operating under conventional operating conditions and is passed through the reduction phase of the method at a rate equal to the normal rate of flow through, or production of the amalgam by the cell. Accordingly, in these prior known methods the amount of amalgam flowing in a unit of time through the reduction phase will, at its height, equal the amount of amalgam normally formed in the cell within the same unit of time. Agitators and circulation pumps and the like, proposed for maintaining amalgam circulation, have neither been successful nor brought about any change in this respect.

It has now been found that the reduction of an azobenzene solution under the above stated conditions does not proceed sufficiently rapidly to be of importance for production purposes. The presence of considerable amounts of alkali metal in the amalgam stream cycled for make up purposes from the reduction phase to the cell serves to prove this fact and this could well be construed to mean that prolongation of reaction period of time would be desirable. Trying to effect such prolongation, however, meets with appreciably great difficulties of technical nature.

The stated shortcoming of the heretofore known methods can, according to the present invenion, be easily and effectively obviated by causing the amalgam issuing from an electrolytic cell to circulate with such speed that the total alkalimetal amount contained in the amount of amalgam passed per unit of time through the hydrazobenzene solution to be reduced is equivalent to at least 1.5 times, preferably several, or even up to 10 times the amount of alkali metal contained in the amalgam amount which is formed in the cell during the same unit of time. In effecting such circulation the amalgam is passed in countercurrent flow to the reoxidized starting material issuing from the oxidation phase and flowing into a special reduction vessel.

It is to be understood that the amalgam stream circulating through the reduction vessel may directly be produced at the corresponding high rate by the electrolytic cell with the partially spent amalgam being recycled to the cell, but desirably, and particularly in connection with chlorine alkali electrolysis, an amalgam stream is withdrawn from the electrolytic cell and is circulated in a special cycle with increased rate through the reduction vessel. Then the partially spent amalgam is returned to the caustic reactor of the cell at a rate corresponding to the starting rate for make-up of consumed alkali metal. For obviating disturbances in the operation of the electrolytic cell the partially spent amalgam is cycled back to the same via a conventional caustic sode reactor from which caustic is discharged and the purified mercury obtained is cycled back to the cell.

Other objects of the invention are accordingly to improve upon the contact of the amalgam with the reoxidized starting material and, more particularly, to do so by increasing the rate at which the amalgam is passed in contact with said reoxidized starting material.

In the accompanying schematic drawing apparatus for carrying out the method of the invention is illustrated to the extent necessary. Considering, first, the electrolytic cell used for producing the alkali amalgam, this is of convenional type and for an illustration and description of the details thereof reference is made to Industrial Electrochemistry, by C. L. Mantell, McGraw-Hill Book Co., New York, third edition, 1950, pages 397–411.

For a sufficient understanding of the construction and operation of the cell from the standpoint of the instant invention, th e cell body 1 would be a gas tight elongated housing with a bottom along which mercury flows to form the cathode of the electrical system. That flow is normally caused by providing a slight incline for the surface along which the mercury flows. In the present instance mercury is shown as being introduced through the line 25 into the right hand end of the cell. Electric current applied to the cell body is thus transmitted to the mercury which is generally referred to as the mobile mercury cathode. The other electrical contact, or anode, is in the form of a series of carbon plates spaced a small distance above the surface of the mercury. These plates are normally carried by suitable stems which pass out through openings in the top of the cell, which openings are arranged to be gas tight. Also, the stems are insulated electrically from the cell. Suitable means are provided for conducting electricity to the stems and thus through them to the plates.

For use in the electrical decomposition of an alkali solution, such as a brine made out of sodium chloride and water, provision is made for introducing the brine solution into the cell so that it will flow along on top of the mercury and at least fill the space between the upper surface of the mercury and the undersurface of the carbon anode plates. In the accompanying drawing the pipe 26 is provided for the introduction of such solution.

When the electric current is turned on it passes between the anode and cathode through the brine solution decomposing the alkali chloride to produce chlorine gas and an amalgam of the alkali with the mercury. Spent brine solution collects on the top of the brine and can be readily removed.

In the instant showing the chlorine gas is drawn off through the pipe 27 and the alkaline mercury amalgam passes off through the pipe 2.

It is also common practice to decompose the alkali mercury amalgam resulting from the operation of such cells so that the pure mercury can be removed and recirculated to the cell for reuse. The element in which such decomposition is effected, normally referred to as a caustic reactor, is shown at 20 on the accompanying drawing. In the present instance, however, all, or a desired portion, of the amalgam produced by the cell is first to be employed for other purposes, so that instead of all of it being recirculated directly to the caustic reactor 20, all, or a desired portion thereof, flows through the line 2 into the equalizing vessel 3 and from thence, by means of the pump 4, through the line 5 and into the reduction vessel 6. There the amalgam loses some of its alkali metal so that as it is returned through the line 7 into the equalizing vessel 3 it is not of the original strength. However, amalgam from the equalizing vessel 3 is drawn off through the line 19 into the caustic reactor 20.

Alternatively, the cell may be of capacity to exceed the demands of the remainder of the system. In such case flow through the line 2 can be adjusted by means of the valve 28 with part of the full strength amalgam being diverted through the line 29 to join with the line 19 and thereby flow directly into the caustic reactor without passing through the rest of the system. In either event—whether the amalgam be of full strength or have some of its alkali removed—it is broken down in the caustic reaction in the following manner. Water is introduced at the right hand end through the line 21 which reacts with the alkali in the amalgam to produce caustic, or alkali hydroxide which is drawn off through the line 22. At the same time, hydrogen gas is liberated and that is taken off through the line 30. Pure mercury remains and it is drawn off through the line 23 and pumped by the pump 24 through the line 25 back into the cell body 1 for use therein.

The alkali amalgam produced by the cell contains from 0.1–0.3% alkali and, as already pointed out, it is wholly or partly fed to the equalizing vessel 3. Here this fresh amalgam will be mixed with amalgam of lower alkali content returned from the reduction vessel 6 through the line 7. This returned amalgam will have an alkali content of 0.01–0.2% alkali. The remainder of the alkali is that which has been used up in the reduction vessel 6 for the production of alkali peroxide.

The mixture of new amalgam and partially spent amalgam in the equalizing vessel 3 will, depending on circumstances, ideally form a mixture containing alkali of from 0.05–0.25%. It is actually such a mixture which is fed to the reduction vessel 6 through the line 5 by means of the pump 4.

The important feature of the invention is that on flow basis the amount of amalgam mixture circulating in a unit of time from the equalizing vessel 3 through the reduction vessel 6 and back to the equalizing vessel through the line 5 and the pump 4 should be considerably greater than the amount of amalgam fed through the line 2 into the vessel 3 from the electrolytic cell 1. In fact, it may well be up to ten times greater. It is by this increase in flow rate without increase in overall volume of amalgam that the invention enables the previously theoretical, or mere laboratory, system previously known to be made operable with a capacity that makes it commercially acceptable.

A mixture fed back from the equalizing vessel 3 through the line 19 through the caustic reactor 20 has approximately the same content of alkali as the amalgam mixture which is fed through the line 5 into the reduction vessel 6. In quantity, however, the amount of amalgam passing through the line 19 is somewhat less than that introduced into the equalizing vessel through the line 3, the difference being consumed in the reduction vessel 6 and the amount of amalgam in the equalizing vessel 3 accordingly being less constant. By the inclusion of the equalizing feature in the invention, however, it is apparent that it is possible to recirculate amalgam from and back to the equalizing vessel at a much greater rate than the rate at which full strength amalgam is produced by the cell 1.

Considering now the other features of the method generally previously known, the material being reduced by the amalgam in the reduction vessel is an azobenzene solution. This enters the vessel through the line 18 at its lower end and follows upwardly through the vessel 6 in countercurrent to the flow of the amalgam down through that vessel. It is thus reduced by the contact with the amalgam to the hydrazobenzene and flows off from the top of the vessel 6 into the oxidation vessel 9. There it is subject to oxidation by oxygen introduced through the line 10 while being stirred by means of the stirrer 12. Any excess oxygen is drawn off from the oxygen chamber 9 through the line 11 at the top of that chamber.

The azobenzene solution mixed with alkali peroxide brought off with the hydrazobenzene solution into the oxidation chamber 9 are passed via the line 13 at the bottom of the chamber 9 to the centrifuge 14. The centrifuge separates the peroxide from the azobenzene and the peroxide is drawn off at 15. At the same time, the azobenzene solution drawn off at 16 and by the action of the pump 17 is forced through the line 18 back to the reduction vessel 6.

It is, of course, to be understood that the flow of the various streams can be controlled and that the method of the invention may also be performed batchwise as far as oxidation and reduction phases, as well as amalgam introduction is concerned.

The results obtained by application of the method of the invention as compared to those obtained by prior known methods without increased circulation rate will become evident from the following example:

In a reduction vessel 6, 50 mm. in diameter and 360 mm. high, filled with glass beads of 5.2 mm. $\phi$ was introduced an alcoholic azobenzene solution with an azobenzene content of 20 g./l., at a rate of flow of 52 cm.$^3$/min. and at a temperature of 60° C. in the reduction vessel. In counter-current flow thereto from the equalizing vessel 3 was introduced amalgam with a Na-content of 0.10% and at a rate of flow varying so that the amount of Na in the amalgam flowing through the reduction vessel 6 per minute was in proportion to the Na-amount contained in the amalgam formed in the electrolysis cell within the same period of time, as shown in column I of the following table wherein column II gives the reduction result as expressed in percentage of the azobenzene amount and column III discloses the gram amount of produced peroxide expressed as $Na_2O_2 \cdot 8H_2O$, all per minute:

| I | II | III |
|---|---|---|
|  | Percent |  |
| 0.5 | 30 | 0.41 |
| 1.0 | 50 | 0.70 |
| 2.7 | 65 | 0.90 |
| 5.0 | 80 | 1.10 |
| 8.0 | 97.5 | 1.34 |
| 10.0 | 98.5 | 1.36 |

A too strong alkalinity possibly occurring in the oxidation phase may be neutralized by an acidic additive, e.g. by adding hydrochloric acid which reacts to form sodium chloride which is recovered together with the peroxide.

It has also been ascertained that for obtaining the greatest possible reducing capacity, complete reduction of the oxidyzed hydrocarbon compound, commonly azobenzene, is not essential but that reduction should be carried out to 98% at the highest, advantageously to 80–85% only. In this way it is possible to prevent the azocompound from being converted into products which cannot be utilized in the production of peroxides.

In distinction from the first proposed methods it has subsequently been suggested that the use of a benzene-alcohol mixture as a solvent in place of using alcohol only be more advantageous for enhancing the solubility of an organic autooxidizable compound, e.g., azobenzene. Practice has shown, however, that in many respects it is more beneficial to use solely ethanol, e.g., raw sulfite alcohol. Then the concentration of the organic compound will remain low in consequence of which the obtained peroxide will not become colored. Also attendant explosion hazard will diminish appreciably and operational safety will increase correspondingly. By using raw sulfite alcohol in place of the benzene-alcohol mixture the equipment can be appreciably simplified which naturally beneficially affects commercial realization of the process.

Moreover it has been ascertained that the process of the invention can best be carried out at a temperature exceeding 35° C., preferably at a temperature range of from 65 to 79° C.

It has also been ascertained that for obtaining the greatest possible capacity, impure azocompounds, e.g. azobenzene should not be used but that the purity degree of the same should be purified correspondingly. If technical materials are used which contain azo dyes and nitrocompounds the yield as calculated from the auto-oxidizable compound will decrease by 25–30% of that obtained on using a pure azo-compound.

By modifying prior known methods for the production of hydrogen peroxide by oxidizing e.g. hydrazobenzene in benzene, toluene, etc. the method of the invention can be applied to the said methods also.

Since certain changes in the arrangement illustrated and described and in carrying out the above method and different embodiments of the invention may be made without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. In the method of producing peroxides by the oxidation, with oxygen containing gases, of an organic auto-oxidizable compound, having two easily removable hydrogen atoms in the molecule, in solvents containing alakli metal alcoholate and water, mechanically separating gained peroxides from said solvent mixture, passing the separated solvent then containing alcohol into contact with alkali amalgam to reduce said separated solvent in a reduction zone and then recirculating said solvent so reduced to the said oxidation zone and continuously electrolytically compensating for the alkali metal consumed from said amalgam by causing it to circulate in another circuit including an electrolytic amalgam forming means, the improvement which comprises, directing the amalgam circulation in two parts which meet in a common equalizing vessel, one of said circulation parts including the said reduction zone and circulating the said one circulation part through the said equalizing vessel, the said reduction zone and back to the said equalizing vessel in an amount at least 1.5 times the amount of alkali amalgam electrolytically produced during the same unit of time and reproducing said alkali amalgam by drawing off a second circulation part of alkali containing amalgam from said common equalizing vessel, separating mercury from said drawn off second circulation part, returning said separated mercury to said electrolytic amalgam forming means, and feeding amalgam from said amalgam forming means back to said equalizing vessel.

2. In the method of producing peroxides by the oxidation, with oxygen containing gases, of an organic auto-oxidizable compound, having two easily removable hydrogen atoms in the molecule, in solvents containing alkali metal alcoholate and water, mechanically separating gained peroxides from said solvent mixture, passing the separated solvent then containing alcohol into contact with alkali amalgam to reduce said separated solvent in a reduction zone and then recirculating said solvent so reduced to the said oxidation zone and continuously electrolytically compensating for the alkali metal consumed from said amalgam by causing it to circulate in another circuit including an electrolytic amalgam forming means, the improvement which comprises, directing the amalgam circulation in two parts which meet in a common equalizing vessel, one of said circulation parts including the said reduction zone and circulating the said one circulation part through the said equalizing vessel, the said reduction zone and back to the said equalizing vessel and reproducing said alkali amalgam by drawing off a second circulation part of alkali containing amalgam from said common equalizing vessel, separating mercury from said drawn off second circulation part, returning said separated mercury to said electrolytic amalgam forming means, and feeding amalgam from said amalgam forming means back to said equalizing vessel, the stream velocity in said first circulation part being at least 1.5 times higher than that in said second circulation part.

References Cited in the file of this patent

UNITED STATES PATENTS

| | | |
|---|---|---|
| 2,158,523 | Pfleiderer | May 16, 1939 |

FOREIGN PATENTS

| | | |
|---|---|---|
| 452,302 | Great Britain | Aug. 20, 1936 |